United States Patent
Olgren

[11] Patent Number: 5,988,010
[45] Date of Patent: Nov. 23, 1999

[54] ADJUSTABLE STEERING COLUMN FOR MOTOR VEHICLE

[75] Inventor: Leland Nels Olgren, Frankenmuth, Mich.

[73] Assignee: General Motors Corporation, Detroit, Mich.

[21] Appl. No.: 09/072,239

[22] Filed: May 4, 1998

[51] Int. Cl.[6] .................................................. B62D 1/18
[52] U.S. Cl. .............................. 74/493; 74/491; 74/492; 280/775
[58] Field of Search ........................... 74/491, 492, 493; 280/775, 777

[56] References Cited

U.S. PATENT DOCUMENTS

| | | | |
|---|---|---|---|
| 4,209,074 | 6/1980 | York | 180/78 |
| 5,213,004 | 5/1993 | Hoblingre | 280/775 |
| 5,394,767 | 3/1995 | Hoblingre et al. | 74/493 |

Primary Examiner—Tamara L. Graysay
Assistant Examiner—David Fenstermacher
Attorney, Agent, or Firm—Dean L. Ellis; Robert M. Sigler

[57] ABSTRACT

A steering column including a mast jacket adjustable vertically and horizontally and clamp. The clamp includes a housing having a pair of piston bores and a control shaft bore intersecting each of the piston bores. A control shaft is rotatable in the control shaft bore and connected to a manual operating lever. A pair of passages in the control shaft define gates in the piston bores which are fully open and partially open in an unlocked position and in a locked position, respectively, of the manual operating lever. Aggregates of media grains in the piston bores traverse the open gates without interference in response to relative linear translation between the pistons and the piston bores. The media grains bridge the partially open gates and clump in the piston bores to define solid plugs which rigidly immobilize the pistons. Vertical adjustment of the steering column induces relative linear translation between one of the pistons and its piston bore and horizontal adjustment of the steering column induces relative linear translation between the other of the pistons and its piston bore. When the pistons are immobilized, the position of the steering column relative to the vehicle body is rigidly captured.

7 Claims, 2 Drawing Sheets

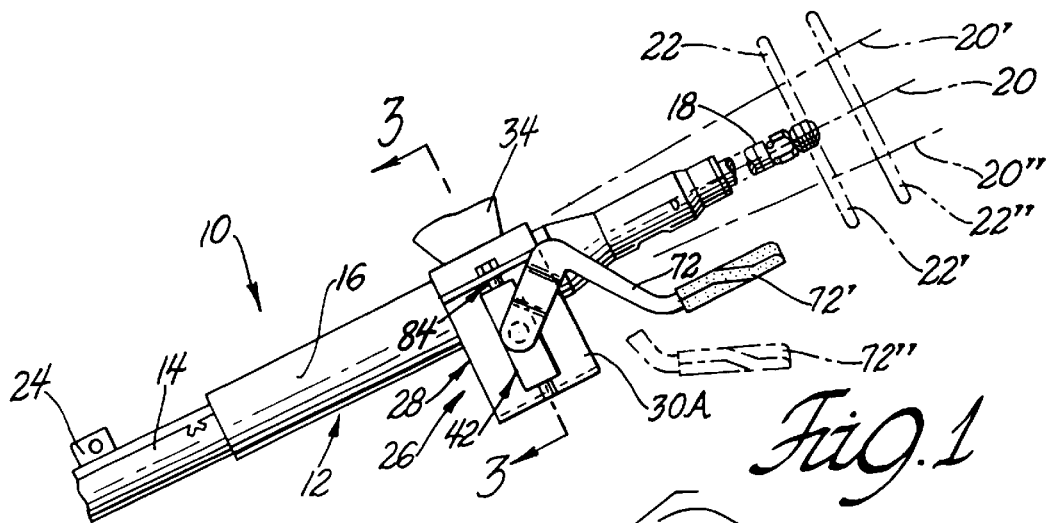
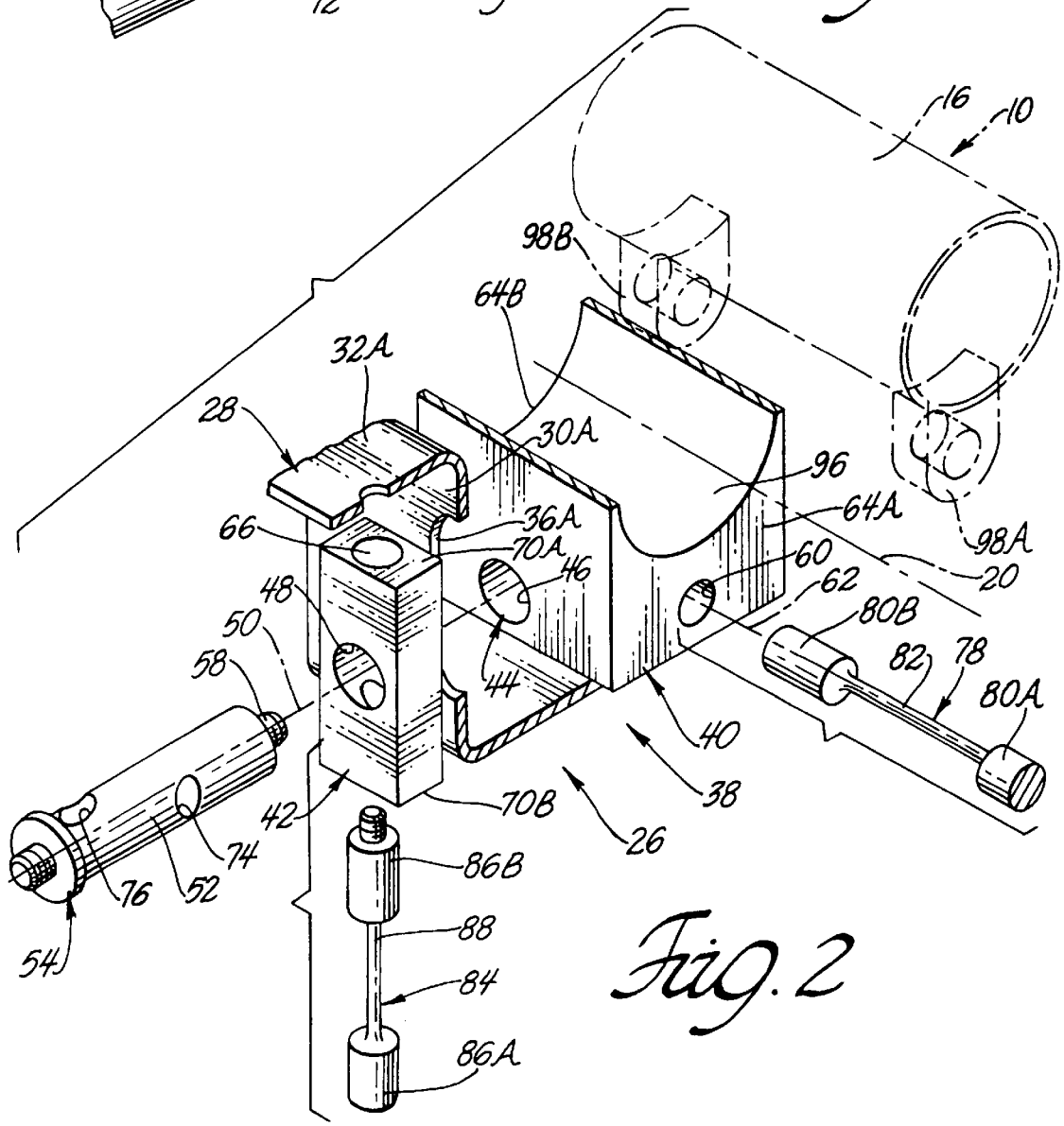

ADJUSTABLE STEERING COLUMN FOR MOTOR VEHICLE

TECHNICAL FIELD

This invention relates to adjustable steering columns for motor vehicles.

BACKGROUND OF THE INVENTION

A typical motor vehicle steering column includes a tubular mast jacket, a steering shaft supported on the mast jacket for rotation about a longitudinal centerline of the steering column, and a steering hand wheel attached to the steering shaft at the top of the steering column. The mast jacket may be pivotable up and down on a body of the motor vehicle to adjust the vertical position of the steering hand wheel and/or the length of the mast jacket may be variable to adjust the horizontal position of the steering hand wheel. Such adjustable steering columns typically include a clamp by which a stationary bracket and the mast jacket are squeezed together to capture by friction the position of the mast jacket. To enhance the friction couple between the mast jacket and the stationary bracket, it is known to form teeth on the stationary bracket and on the mast jacket which mesh when the clamp closes and which unmesh when the clamp opens. A motor vehicle steering column according to this invention is a novel alternative to the aforesaid adjustable steering columns having friction clamps and enhanced friction clamps.

SUMMARY OF THE INVENTION

This invention is a new and improved steering column for a motor vehicle including a mast jacket pivotable up and down for vertical adjustment of the steering column and variable lengthwise for horizontal adjustment of the steering column. A clamp on the steering column includes a housing having a pair of piston bores and a control shaft bore intersecting each of the piston bores. A control shaft is rotatable in the control shaft bore and connected to a manual operating lever. A pair of passages in the control shaft define gates in the piston bores which are fully open and partially open in an unlocked position and in a locked position, respectively, of the manual operating lever. Aggregates of media grains in the piston bores traverse the open gates without interference in response to relative linear translation between the pistons and the piston bores. The media grains bridge the partially open gates and clump in the piston bores to define solid plugs which rigidly immobilize the pistons in their piston bores. The housing assembly and the pistons are disposed between the mast jacket and a body of the motor vehicle such that vertical adjustment of the steering column induces relative linear translation between one of the pistons and its piston bore and horizontal adjustment of the steering column induces relative linear translation between the other of the pistons and its piston bore. When the pistons are immobilized in their piston bores, the position of the steering column relative to the vehicle body is rigidly captured.

BRIEF DESCRIPTION OF THE DRAWINGS

FIG. 1 is a fragmentary elevational view of an adjustable motor vehicle steering column according to this invention;

FIG. 2 is an exploded perspective view of a clamp on the steering column according to this invention;

DESCRIPTION OF THE PREFERRED EMBODIMENT

Figure 3:
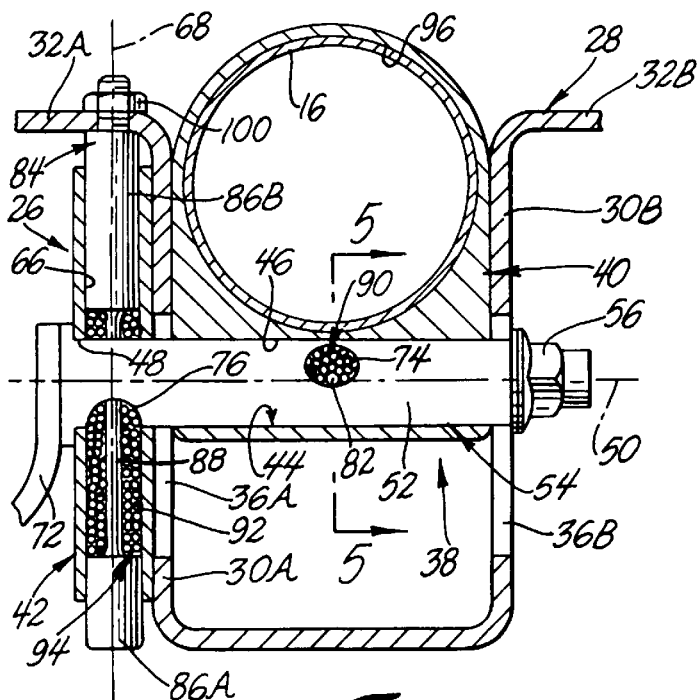
FIG. 3 is an enlarged sectional view taken generally along the plane indicated by lines 3—3 in FIG. 1.

Referring to FIGS. 1–3, a steering column 10 according to this invention has a schematically represented tubular mast jacket assembly 12 including a lower mast jacket 14 and an upper mast jacket 16 telescopically overlapping the lower mast jacket. A steering shaft 18 is supported on the mast jacket assembly for rotation about a longitudinal centerline 20 of the steering column. A steering hand wheel 22 is rigidly attached to the steering shaft 18 at the top of the steering column. The mast jacket assembly 12 is connected to a body, not shown, of a motor vehicle at a pivot bracket 24 on the lower mast jacket 14. The steering column 10 is adjustable vertically by up and down pivotal movement of the mast jacket assembly between an upper limit position 20' and a lower limit position 20". The mast jacket assembly 12 is variable lengthwise for horizontal adjustment of the steering column by linear translation of the upper mast jacket 16 relative to the lower mast jacket 14 in the direction of the longitudinal centerline 20 between an inner limit position 22' and an outer limit position 22".

A clamp 26 on the steering column 10 includes a U-shaped stationary bracket 28 having a pair of vertical sides 30A,30B and a pair of horizontal flanges 32A,32B through which the stationary bracket is rigidly attached to a schematically represented structural element 34 of the body of the motor vehicle. The vertical sides 30A,30B of the stationary bracket are pierced by respective ones of a pair of slots 36A,36B parallel to the direction of vertical adjustment of the steering column 10.

A housing assembly 38 of the clamp 26 consists of a first housing 40 closely received between the vertical sides 30A,30B of the stationary bracket and a second housing 42 separated from the first housing by the vertical side 30A of the stationary bracket. A control shaft bore 44 in the housing assembly 38 is defined by a bore 46 in the first housing 40 and a bore 48 in the second housing 42 aligned with the bore 46 on a lateral centerline 50 of the clamp.

A cylindrical shank 52 of a control shaft 54 of the clamp 26 traverses the stationary bracket 28 through the slots 36A,36B and is supported in the control shaft bore 44 of the housing assembly 38 for rotation relative thereto about the lateral centerline 50. A nut 56 on a reduced diameter end 58 of the shank of the control shaft retains the control shaft on the stationary bracket. The shank 52 of the control shaft cooperates with the slots 36A,36B in the stationary bracket in accommodating movement of the housing assembly 38 relative to the stationary bracket 28 in the direction of vertical adjustment of the steering column and in restraining the housing assembly relative to the stationary bracket in the direction of horizontal adjustment of the steering column.

A horizontal piston bore 60 in the housing assembly 38 on a horizontal centerline 62 of the clamp traverses the first housing 40 of the housing assembly between a pair of opposite end walls 64A,64B of the first housing and intersects the control shaft bore 44. A vertical piston bore 66 in the housing assembly 38 on a vertical centerline 68 of the clamp traverses the second housing 42 of the housing assembly between a pair of opposite end walls 70A,70B of the second housing and intersects the control shaft bore 44.

Figure 5:
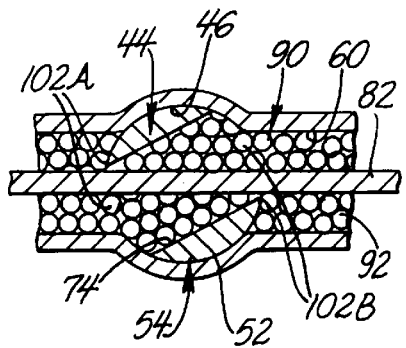
FIG. 5 is an enlarged sectional view taken generally along the plane indicated by lines 5—5 in FIG. 3.
Figure 4:
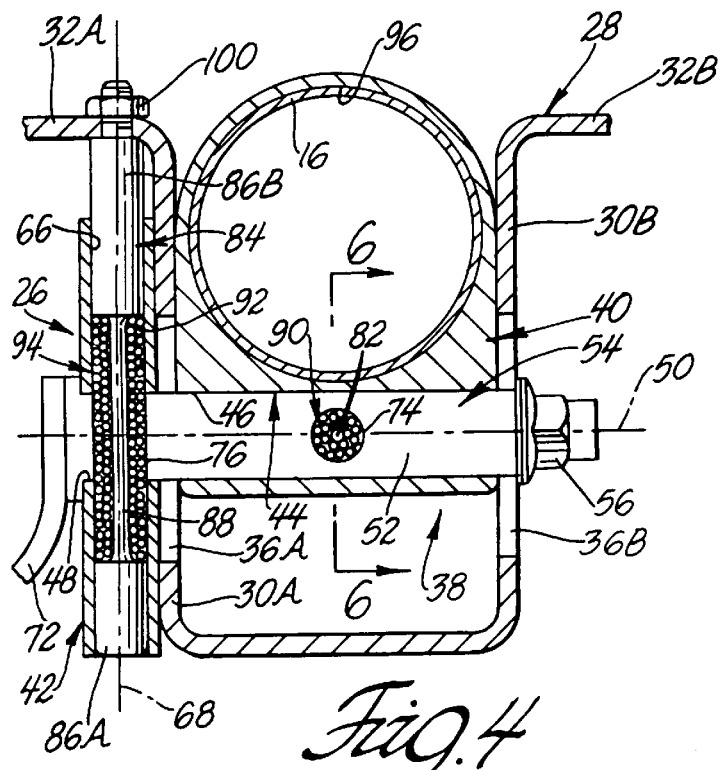
FIG. 4 is similar to FIG. 3 showing elements of the clamp on the steering column according to this invention in different relative positions.
Figure 6:
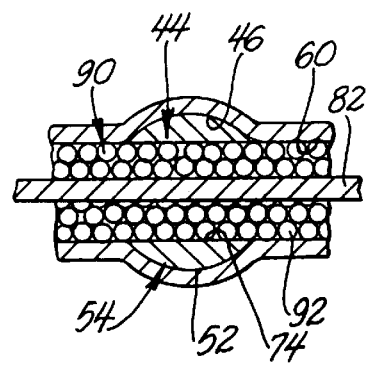
FIG. 6 is an enlarged sectional view taken generally along the plane indicated by lines 6—6 in FIG. 4.

A manual operating lever 72 of the clamp is attached to an outboard end of the control shaft and is pivotable with the control shaft about the lateral centerline 50 relative to the housing assembly 38 between a locked position 72' and an unlocked position 72", FIG. 1. The shank 52 of the control shaft 54 has first passage 74 and second passage 76 therein each perpendicular to the lateral centerline 50. The first and the second passages 74,76 are located lengthwise on the shank of the control shaft for registry with the horizontal and vertical piston bores 60,66, respectively, so that the passages define gates in the piston bores. In the unlocked position 72" of the manual operating lever 72, FIGS. 4 and 6, the first and the second passages 74,76 are aligned with the horizontal and vertical piston bores 60,66 so that the gates defined by the passages are fully open. In the locked position 72' of the manual operating lever 72, FIGS. 3 and 5, the passages 74,76 are rotated out of alignment with the horizontal and vertical piston bores so that the gates defined thereby are only partially open.

A horizontal piston 78 of the clamp 26 includes a pair of cylindrical spools 80A,80B separated by an integral neck 82 smaller than the spools. The horizontal piston 78 is disposed in the horizontal piston bore 60 for back and forth linear translation with its spools protruding beyond the end walls 64A,64B of the housing 40 of the housing assembly 38 and with its neck 82 traversing the passage 74 in the shank of the control shaft. A vertical piston 84 of the clamp 26 includes a pair of cylindrical spools 86A,86B separated by an integral neck 88 smaller than the spools. The vertical piston 84 is disposed in the vertical piston bore 66 with its spools protruding beyond the end walls 70A,70B of the housing 42 of the housing assembly and with its neck 88 traversing the passage 76 in the shank of the control shaft.

As seen best in FIGS. 3–6, the horizontal piston bore 60 is filled between the spools 80A,80B and around the neck 82 of the horizontal piston with an aggregate 90 of incompressible media grains 92. The media grains are preferably tiny solid metal or hard plastic spheres having diameters of between 1.0 mm and 3.0 mm. Similarly, the vertical piston bore 66 is filled between the spools 86A,86B and around the neck 88 of the vertical piston with an aggregate 94 of the same incompressible media grains 92. When the gates defined by the passages 74,76 in the shank of the control shaft are open, relative back and forth linear translation between the vertical and the horizontal pistons 84,78 and their vertical and the horizontal piston bores 66,60 causes unobstructed transfer of the aggregates 90,94 of media grains 92 back and forth through the passages 74,76.

The upper mast jacket 16 of the steering column 10 is received in a cylindrical journal 96 on the housing 40 of the housing assembly 38 for linear translation relative to the housing 40 in the direction of the longitudinal centerline 20 of the steering column, i.e. in the direction of horizontal adjustment of the steering column. Because the cylindrical journal 96 surrounds the upper mast jacket and thereby restricts linear translation of the housing 40 relative to the upper mast jacket perpendicular to the longitudinal centerline 20 of the steering column, i.e. in the direction of vertical adjustment of the steering column, the housing 40 and the housing assembly 38 pivot vertically as a unit with the steering column between its upper and the lower limit positions 20',20".

The spools 80A,80B of the horizontal piston 78 are rigidly connected to the upper mast jacket 16 outboard of the end walls 64A,64B of the housing 40 of the housing assembly 38 by a pair of schematically represented trunnions 98A,98B, FIG. 2, on the upper mast jacket. Accordingly, horizontal adjustment of the steering column between its inner and the outer limit positions 22',22" induces back and forth relative linear translation between the horizontal piston 78 and the horizontal piston bore 60. The spool 86B of the vertical piston 84 is rigidly attached to the horizontal flange 32A of the stationary bracket 28 by a fastener nut 100, FIGS. 3–4. Accordingly, vertical adjustment of the steering column between its upper and lower limit positions 20',20" induces back and forth relative linear translation between the vertical piston 84 and the vertical piston bore 66.

With the manual operating lever 72 in its unlocked position 72", the steering column is manually adjusted horizontally by a force is applied to the upper mast jacket to induce linear translation thereof in the direction of the longitudinal centerline 20 of the steering column. The corresponding back and forth relative linear translation between the horizontal piston 78 and the horizontal piston bore 60 transfers the aggregate 90 of media grains 92 in the horizontal piston bore through the fully open gate defined by the passage 74 in the control shaft without interference. The steering column is manually adjusted vertically by a force applied to the upper mast jacket to induce vertical pivotal movement of the steering column. The corresponding back and forth relative linear translation between the vertical piston 84 and the vertical piston bore 66 transfers the aggregate 94 of media grains 92 in the vertical piston bore through the fully open gate defined by the passage 76 in the control shaft without interference.

When a comfortable position of the steering hand wheel 22 is attained, the operating lever 72 is pivoted manually from its unlocked position 72" to its locked position 72'. Corresponding rotation of the control shaft 54 transitions the gate defined by the passage 74 from fully open, FIGS. 4 and 6, to partially open, FIGS. 3 and 5. In that circumstance, the media grains 92 of the aggregate 90 bridge respective ones of a pair of gaps 102A, 102B, FIG. 5, between the horizontal piston bore and exposed edges of the passage 74 in the control shaft. Such bridging causes the media grains 92 of the aggregate 90 to clump on opposite sides of the control shaft and thereby define effectively solid plugs in the horizontal piston bore on opposite sides of the control shaft which positively block relative linear translation between the horizontal piston and the horizontal piston bore. The horizontal adjusted position of the steering column relative to the vehicle body is thus rigidly captured.

The aforesaid corresponding rotation of the control shaft 54 likewise transitions the gate defined by the passage 76 from fully open to partially open. The media grains 92 in the aggregate 94 in the vertical piston bore 66 bridge gaps, not shown, between exposed edges of the passage 76 and the vertical piston bore and clump on opposite sides of the control shaft. The aggregate 94 of media grains 92 thus also defines a pair of solid plugs in the vertical piston bore on opposite sides of the control shaft which positively block relative linear translation between the vertical piston and the vertical piston bore and thus rigidly capture the vertical adjusted position of the steering column coincident with capture of its horizontal adjusted position. To release the steering column for further adjustment, the manual operating lever 72 is pivoted from its locked position 72' to its unlocked position 72" to transition the gates defined by the passages 74,76 from partially open to fully open.

An important feature of this invention is that the clamp 26 affords infinite vertical and horizontal adjustability of the steering column 10. Another important feature of this invention is that the gates defined by the passages 74,76 are not required to be fully closed in the locked position 72' of the operating lever so that the stroke between the locked and unlocked positions 72',72" may be made comfortably small.

Still another important feature of this invention is that very close interfaces are not required between the vertical and horizontal pistons and their vertical and horizontal piston bores. That is, leakage of the media grains 92 from the horizontal and the vertical piston bores is effectively foreclosed as long as the depth of the interfaces between the vertical and horizontal pistons and their vertical and horizontal piston bores does not exceed the diameter of the media grains.

Having thus described the invention, what is claimed is:

1. A steering column for a motor vehicle including
a mast jacket supported on a body of said motor vehicle for adjustment in one of a horizontal direction and a vertical direction, and
a clamp for releasably capturing a selected position of said mast jacket,
characterized in that said clamp comprises:
   a housing having a piston bore therein,
   a manual operating lever supported on said housing for pivotal movement between a locked position and an unlocked position,
   a gate means on said housing connected to said manual operating lever and defining a fully open gate in said piston bore in an unlocked position of said manual operating lever and a partially open gate in said piston bore in a locked position of said manual operating lever,
   an aggregate of incompressible media grains in said piston bore,
   a piston means supported in said piston bore for back and forth linear translation operative to transfer said aggregate of incompressible media grains back and forth through said fully open gate in said piston bore,
   said incompressible media grains bridging said partially open gate in said piston bore and clumping in said piston bore so that said aggregate of incompressible media grains defines a pair of effectively solid plugs in said piston bore blocking back and forth linear translation of said piston means,
   a connecting means operative to attach said housing to a first one of said vehicle body and said mast jacket with said piston bore parallel to said one of said horizontal and said vertical directions of adjustment of said steering column, and
   a connecting means operative to attach said piston means to a second one of said vehicle body and said mast jacket so that adjustment of said steering column in said one of said horizontal and said vertical directions of adjustment induces relative linear translation between said piston bore and said piston means.

2. The steering column for a motor vehicle recited in claim 1 wherein said gate means on said housing comprises:
   a control shaft bore in said housing perpendicular to and intersecting said piston bore substantially in the center of said piston bore,
   a control shaft rigidly connected to said manual operating lever and supported in said control shaft bore for rotation about a lateral centerline of said clamp, and
   a passage in said control shaft perpendicular to said lateral centerline registering with said piston bore and defining said fully open gate when said passage is aligned with said piston bore and defining said partially open gate when said passage rotates with said control shaft out of alignment with said piston bore.

3. The steering column for a motor vehicle recited in claim 2 wherein said aggregate of incompressible media grains comprises:
   a plurality of solid metal spheres having diameters in a range of between 1.0 mm and 3.0 mm.

4. The steering column for a motor vehicle recited in claim 2 wherein said aggregate of incompressible media grains comprises:
   a plurality of solid plastic spheres having diameters in a range of between 1.0 mm and 3.0 mm.

5. A steering column for a motor vehicle including
a mast jacket supported on a body of said motor vehicle for adjustment in a horizontal direction and in a vertical direction, and
a clamp for releasably capturing coincidentally a selected horizontal position and a selected vertical position of said mast jacket,
characterized in that said clamp comprises:
   a housing assembly having a horizontal piston bore therein and a vertical piston bore therein and a control shaft bore perpendicular to and intersecting each of said horizontal piston bore and said vertical piston bore,
   a mounting means operative connect said housing assembly to said mast jacket and to said vehicle body such that said housing assembly is moveable as a unit with said mast jacket in said vertical direction of adjustment of said steering column and said mast jacket is moveable relative to said housing assembly in said horizontal direction of adjustment of said steering column,
   a control shaft supported in said control shaft bore for rotation about a lateral centerline of said clamp,
   a manual operating lever rotatable as a unit with said manual operating lever having a locked position and an unlocked position,
   a first passage in said control shaft perpendicular to said lateral centerline of said clamp registering with said horizontal piston bore and defining a fully open gate in said horizontal piston bore in said unlocked position of said manual operating lever and defining a partially open gate in said horizontal piston bore in said locked position of said manual operating lever,
   a second passage in said control shaft perpendicular to said lateral centerline of said clamp registering with said vertical piston bore and defining a fully open gate in said vertical piston bore in said unlocked position of said manual operating lever and defining a partially open gate in said vertical piston bore in said locked position of said manual operating lever,
   an aggregate of incompressible media grains in each of said horizontal piston bore and said vertical piston bore,
   a horizontal piston supported in said horizontal piston bore for back and forth linear translation operative to transfer said aggregate of incompressible media grains back and forth through said fully open gate in said horizontal piston bore,
   a vertical piston supported in said vertical piston bore for back and forth linear translation operative to transfer said aggregate of incompressible media grains back and forth through said fully open gate in said vertical piston bore,
   said incompressible media grains bridging said partially open gates in each of said horizontal and said vertical piston bores and clumping in each of said horizontal and said vertical piston bores so that said aggregates of incompressible media grains define respective pairs of effectively solid plugs in said horizontal and said vertical piston bores blocking back and forth linear translation of each of said horizontal and said vertical pistons, a connecting means connecting said horizontal piston to said mast jacket for linear translation as a unit therewith in said direction of horizontal adjustment of said steering column to induce relative linear translation between said horizontal piston and said horizontal piston bore, and a connecting means rigidly connecting said vertical piston to said vehicle body so that vertical adjustment of said steering column induces relative linear translation between said vertical piston and said vertical piston bore.

6. The steering column for a motor vehicle recited in claim 5 wherein said aggregate of incompressible media grains comprises:

a plurality of solid metal spheres having diameters in a range of between 1.0 mm and 3.0 mm.

7. The steering column for a motor vehicle recited in claim 5 wherein said aggregate of incompressible media grains comprises:

a plurality of solid plastic spheres having diameters in a range of between 1.0 mm and 3.0 mm.

* * * * *